ULTRAVIOLET SPECTRUM OF PYRROLNITRIN

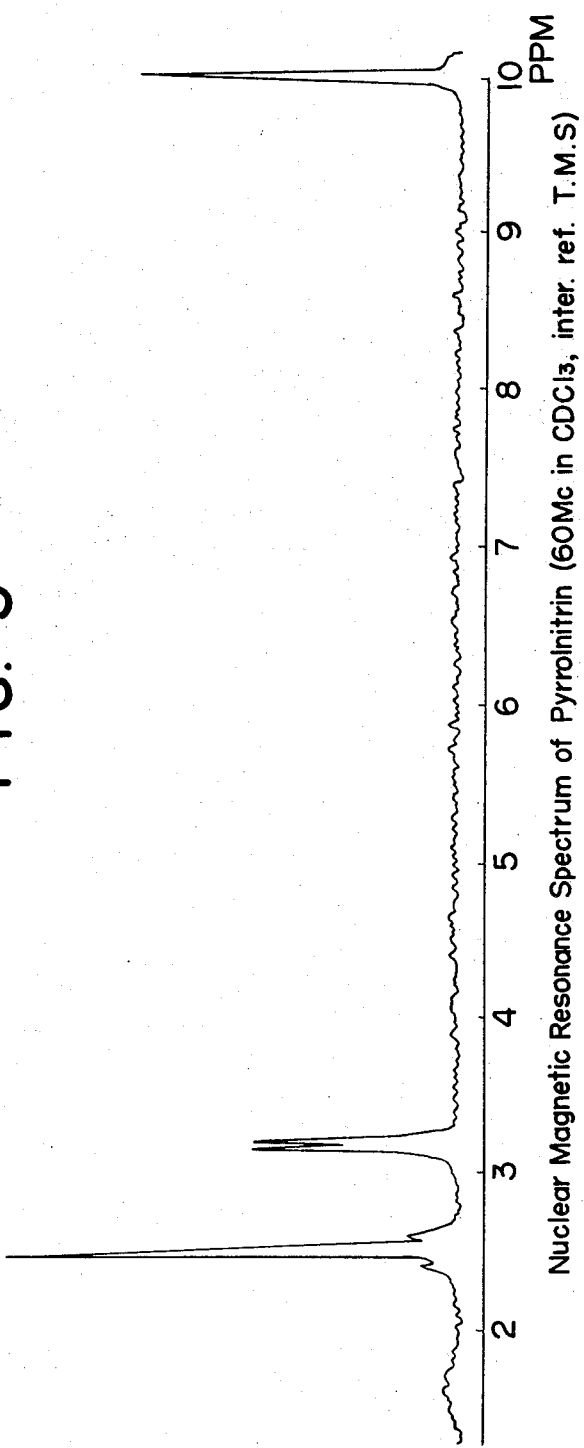

United States Patent Office 3,699,121
Patented Oct. 17, 1972

3,699,121
ANTIBIOTIC
Kei Arima, Gakuzo Tamura, Hiroshi Imanaka, Masanobu Kousaka, and Akio Fukuda, Tokyo, Japan, assignors to Fujisawa Pharmaceutical Co., Ltd.
Continuation of application Ser. No. 440,747, Mar. 18, 1965. This application June 28, 1967, Ser. No. 649,745
Claims priority, application Japan, Mar. 25, 1964, 39/16,338
Int. Cl. A61k 21/00
U.S. Cl. 260—326.9
1 Claim

ABSTRACT OF THE DISCLOSURE 3-(2-nitro-3-chlorophenyl) - 4 - chloropyrrole (called pyrrolnitrin) and methods of preparation through cultivation of *Pseudomonas pyrrocinia*, *Pseudomonas aeruginosa*, *Pseudomonas mephitica*, *Pseudomonas ovalis* and *Pseudomonas shuylkilliensis* followed by separation from the culture broth. The compound is an antibiotic, useful in the treatment of fungal diseases in warm blooded animals.

---

This application is a continuation of Ser. No. 440,747 filed Mar. 18, 1965, now abandoned.

This invention relates to a new chemical substance having valuable antibiotic properties. More particularly, this invention relates to a new and useful antibiotic called pyrrolnitrin, and to methods for its production.

Figure 1:
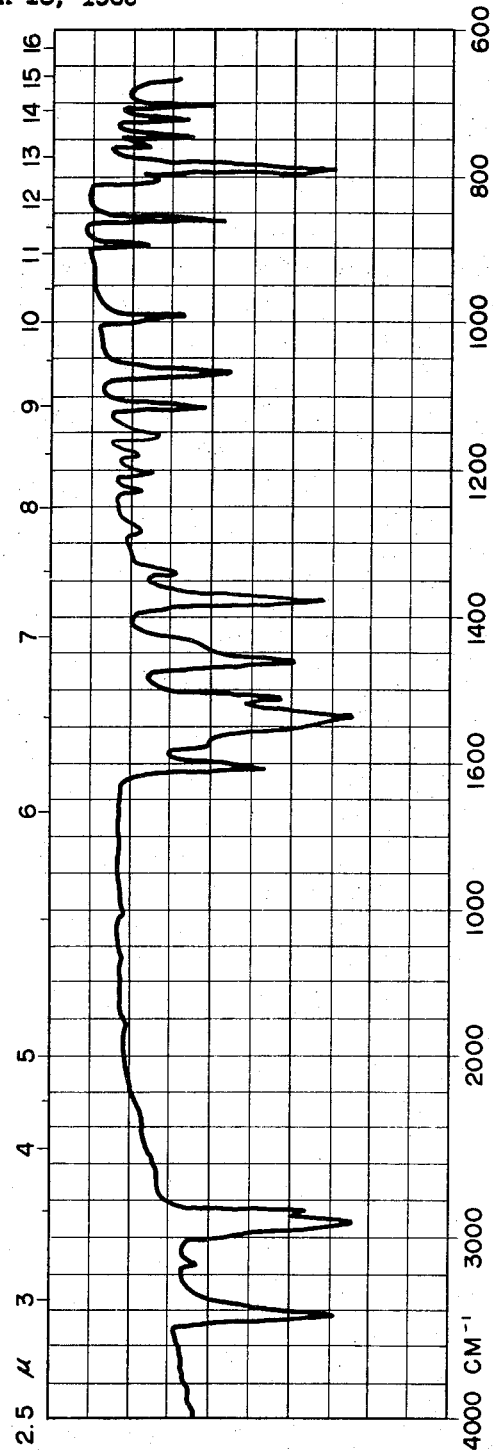
Figure 2:
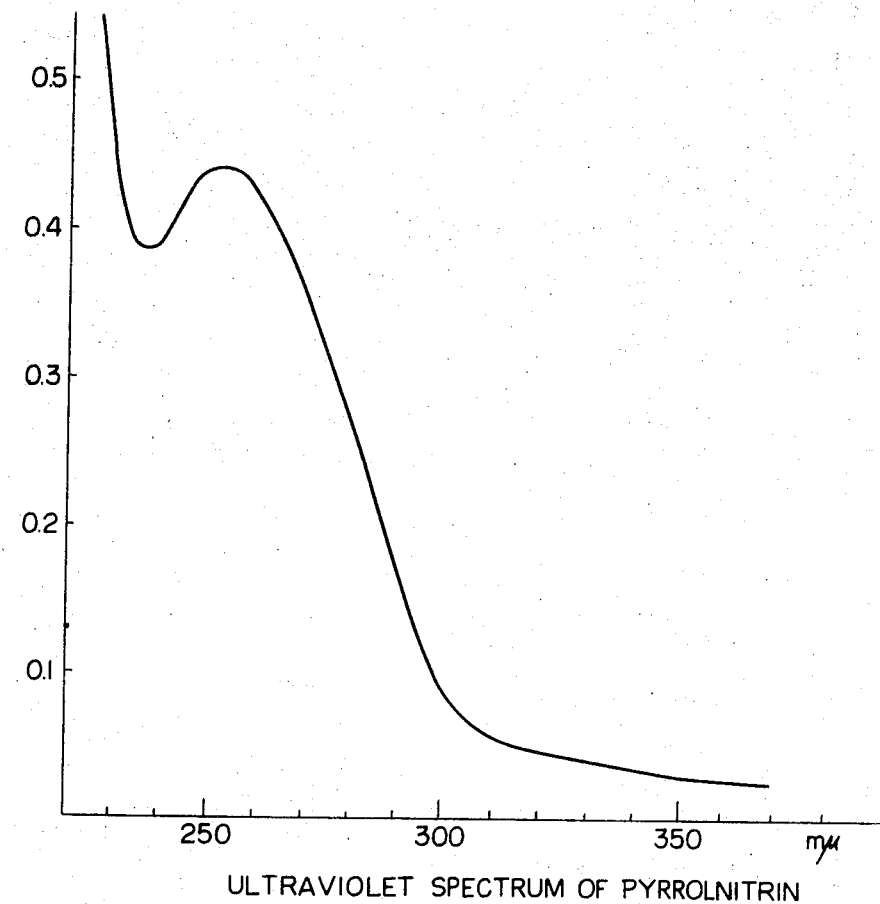

In the accompanying drawings, FIG. 1 is the curve of an infrared absorption spectrum of pyrrolnitrin, FIG. 2 is the curve of an ultraviolet absorption spectrum of pyrrolnitrin; and FIG. 3 is the curve of a nuclear magnetic resonance spectrum of pyrrolnitrin.

Now it has been found that the new antibiotic substance can be produced by cultivation of a certain strain of Pseudomonas genus. Preferred strains for the microbial production of pyrrolnitrin are referred to, for convenience, as No. 2327, B–16, No. 29, No. 103 and CB–416, all of which were isolated by us from soil. After mycological observations of these strains, as will be detailed hereinafter, the strains B–16, No. 29, No. 103 and CB–416 were found to be *Pseudomonas aeruginosa*, *Pseudomonas mephitica*, *Pseudomonas ovalis* and *Pseudomonas shuylkilliensis*, respectively. No. 2327 strain was identified as a new strain and named as *Pseudomonas pyrrocinia*. A culture of the living micro organism has been deposited with and is available from the American Type Culture Collection; it has been designated as ATCC 15958.

TABLE 1.—FORM OF CELLS

| No. 2327 | B–16 | No. 29 | No. 103 | CB–416 |
|---|---|---|---|---|
| Rods (rounded): 0.5–0.8 x; 1.2–2.0 u. Occurring singly. | Rods (rounded): 0.5–0.7 x; 1.2–2.0 u. Occurring singly, rarely in pairs and in short chains. | Rods (rounded): 0.5–0.8 x; 1.4–1.6 u. Mostly occurring singly. | Rods (rounded): 0.5–0.8 x; 1.4–2.0 u. Mostly occurring singly. | Rods (rounded): 0.6–0.75 x; 0.9–1.35 u. Mostly occurring singly, but sometimes in pairs and in short chains. |
| Motile with flagella. | Motile with a single polar flagellum. | Motile with polar flagella. | Motile with polar flagella. | Motile with polar flagella. |
| No sporulation. | No sporulation. | No sporulation. | No sporulation. | No sporulation. |
| Gram-negative. | Gram-negative. | Gram-negative. | Gram-negative. | Gram-negative. |

TABLE 2.—CULTURAL CHARACTERISTICS

| | No. 2327 | B-16 | No. 29 | No. 103 | CB-416 |
|---|---|---|---|---|---|
| Nutrient agar colony | After 48 hours at 37° C., raised, circular, about 4-8 mm. in diameter, entire periphery, opaque, pale grey to creamy. | After 48 hours at 37° C., large, spreadingly, irregular periphery, translucent, pale grey to creamy. | After 48 hours at 30° C., convex, circular, entire periphery, greyish pale yellow. | After 48 hours at 30° C., circular, smooth, entire periphery, pale yellow. | After 48 hours at 30° C., raised, smooth, entire or slightly undulate, translucent, glistening, pale yellow to light reddish yellow. |
| Nutrient agar slant culture (after 48 hours at 30° C.). | Good growth, spreading, thick, raised, entire, lustered grey to creamy. | Abundant growth, somewhat spreading, lustered brownish yellow. Medium greenish yellow. | Moderate growth, wrinkled, greyish brown. | Moderate growth, filiform to spreading, translucent, glistening. | Moderate growth, smooth, entire, raised, translucent, somewhat glistening, pale yellow. |
| Nutrient broth (after 48 hours at 30° C. | Slightly turbid with pellicle, no sedimentation. | Turbid, with thin pellicle. | Turbid sediment. | Strong turbid, with pellicle and scanty sediment. | Turbid, with fragile pellicle and silky sediment. |
| Glutamate agar | After 48 hours at 37° C., good growth. No pigment formed. | After 48 hours at 37° C., good growth, spreading, slightly yellowish green color. | After 48 hours at 30° C., moderate growth. No pigment formed. | After 48 hours at 30° C., abundant growth, greenish white. Medium greenish yellow. | After 48 hours at 30° C., moderate growth, pale yellowish brown to pale brown. Medium pale yellow. |
| Glutamate broth (after 48 hours at 30° C.). | Good growth. No pigment formed. | Strong turbid. Soluble pigment formed. | Moderate growth. No pigment formed. | Turbid with fragile pellicle and slightly greenish yellow color. | Strong turbid, with fragile pellicle, light brown color. |
| Peptone water (after 48 hours at 30° C., pH 7.0). | Good growth, strong turbid, with silky-stringy sediment. No pellicle but in the aged culture fragile pellicle formed. | Good growth, strong turbid, with delicate pellicle. Yellowish green pigment formed. | Moderate growth slightly turbid, with delicate pellicle. | Turbid, with fragile pellicle and greenish yellow color. | Moderate turbid, with creamy color and silky stringy sediment. |
| Gelatin stab (after 7 days at 15-20° C.). | Good growth, stratiform liquefaction. No change in color. | Good growth. Rapid liquefaction to stratiform, the medium becoming green. | Growth near surface. Slow liquefaction. | Weak growth near surface. No liquefaction. | Good growth, stratiform liquefaction with brownish white sediment. No change in color. |
| BCP milk (after 7 days at 30° C.) | Liquefaction at pH 6.6–6.8 | Rapid liquefaction, showing slight alkaline property. | Liquefaction, showing alkaline property. | Weak liquefaction, showing alkaline property. | Liquefaction, showing slight alkaline property. |
| Potato (after 48 hours at 30° C.) | Substantially no color, slightly creamy. Moistened thin growth. | Brown, moistened growth, the medium becoming slightly green (at 37° C.). | Lustered brown colored growth. | Thin, yellowish brown colored growth. | Brownish, spreading, viscid, thick. |

TABLE 3 (TABLE 3-1) PHYSIOLOGICAL PROPERTIES

| | No. 2327 | B-16 | No. 29 | No. 103 | CB-416 |
|---|---|---|---|---|---|
| Pigment formation: | | | | | |
| Water-soluble | — | (¹) | — | — | (²) |
| Water-insoluble | — | ³ | — | — | — |
| Indole formation | — | — | — | — | — |
| Reduction of nitrate | — | + | + | — | + |
| Anaerobic growth in the presence of nitrate. | — | + | — | — | — |
| Formation of hydrogen sulfide | ± | + | — | — | — |
| Hydrolysis of starch | + | — | — | — | — |
| Catalase activity | + | + | + | + | + |
| Formation of acetoin | — | + | — | — | — |

¹ Green fluorescence.
² Occasionally pale green.
³ Greenish yellow fluorescence.
⁴ After 6–7 days.

TABLE 3 (TABLE 3-2)

| | No. 2327 | B-16 | No. 29 | No. 103 | CB-416 |
|---|---|---|---|---|---|
| Tolerance against salt (after 24 hours at 30° C.): | | | | | |
| Glutamate culture medium: | | | | | |
| NaCl, 0.2% | +++ | +++ | +++ | +++ | +++ |
| NaCl, 0.5% | +++ | +++ | +++ | +++ | +++ |
| NaCl, 1.0% | +++ | +++ | ++ | +++ | +++ |
| NaCl, 3.0% | ± | ~ | ~ | ~ | ~ |
| NaCl, 5.0% | — | — | — | — | — |
| Meat extract culture medium: | | | | | |
| NaCl, 0.2% | +++ | +++ | +++ | +++ | +++ |
| NaCl, 0.5% | +++ | +++ | +++ | +++ | +++ |
| NaCl, 1.0% | +++ | +++ | ++ | +++ | +++ |
| NaCl, 3.0% | ± | ± | ~ | ~ | ~ |
| NaCl, 5.0% | — | — | — | — | — |
| Alcohol-containing meat extract culture medium: | | | | | |
| Alcohol, 0.5% | +++ | +++ | +++ | +++ | +++ |
| Alcohol, 1.0% | ± | ± | ± | ± | ± |
| Alcohol, 3.0% | — | — | — | — | — |
| Alcohol, 5.0% | — | — | — | — | — |
| Resistance against heat (80° C., 5 min.) | (¹) | (¹) | (¹) | (¹) | (¹) |
| Growth temperature (after 24 hours, nutrient broth and glutamate broth): | | | | | |
| Temperature, 10° C | ± | ± | ± | ± | ± |
| Temperature, 26.5° C | +++ | +++ | +++ | +++ | +++ |
| Temperature, 30° C | +++ | +++ | +++ | +++ | +++ |
| Temperature, 37° C | ++ | ++ | ++ | ++ | ++ |
| Temperature, 42° C | ± | ± | ± | ± | ± |
| Growth pH (after 24 hours at 30° C., peptone water): | | | | | |
| pH, 3 | — | — | — | — | — |
| pH, 4 | + | + | + | + | + |
| pH, 5 | ++ | ++ | ++ | ++ | ++ |
| pH, 6 | +++ | +++ | +++ | +++ | +++ |
| pH, 7 | +++ | +++ | +++ | +++ | +++ |
| pH, 8 | ++ | ++ | ++ | ++ | ++ |
| pH, 9 | + | + | + | + | + |
| Oxidative activity: | | | | | |
| Glucose | ++ | ++ | ++ | ++ | ++ |
| Gluconic acid | — | — | — | — | — |
| Glycerine | ~ | ± | + | + | + |
| Chitochrome oxidase | + | + | + | + | + |

¹ Completely killed.

TABLE 3 (TABLE 3-3)

| | No. 2327 | | | B-16 | | | No. 29 | | | No. 103 | | | CB-416 | | |
|---|---|---|---|---|---|---|---|---|---|---|---|---|---|---|---|
| | A | B | C | A | B | C | A | B | C | A | B | C | A | B | C |
| Peptone medium (after 7 days at 30° C.): | | | | | | | | | | | | | | | |
| Glucose | + | − | + | + | − | + | + | − | + | + | − | − | + | + | − | + |
| Fructose | + | − | − | + | − | − | + | − | + | + | − | − | − | + | − | − |
| Maltose | + | − | − | + | − | − | + | − | − | + | − | − | − | + | − | − |
| Trehalose | + | − | − | + | − | ± | + | − | − | + | − | − | + | − | − | − |
| Galactose | + | − | + | + | − | − | + | − | − | + | − | − | − | + | − | − |
| Mannose | + | − | − | + | − | − | + | − | − | + | − | − | − | + | − | − |
| Xylose | ± | − | − | + | − | − | + | − | + | + | − | − | + | + | − | + |
| Arabinose | −~± | − | − | + | − | − | + | − | − | + | − | − | − | + | − | ± |
| Sucrose | + | − | ± | + | − | − | + | − | + | + | − | − | − | + | − | − |
| Lactose | ++ | − | − | + | − | − | + | − | − | + | − | − | − | + | − | − |
| Raffinose | + | − | − | + | − | − | + | − | − | + | − | − | − | + | − | − |
| Mannitol | + | − | − | + | − | − | + | − | − | + | − | − | − | + | − | − |
| Glycerine | + | − | − | + | − | − | + | − | − | + | − | − | − | + | − | − |
| Starch | + | − | − | + | − | − | + | − | − | + | − | − | − | + | − | − |
| Inulin | + | − | − | + | − | − | + | − | − | + | − | − | − | + | − | − |
| Control | + | − | − | + | − | − | + | − | − | + | − | − | − | + | − | − |
| Synthetic medium (after 7 days at 30° C.): | | | | | | | | | | | | | | | | |
| Glucose | + | − | + | + | − | + | + | − | + | + | − | + | − | + |
| Lactose | −~± | − | + | + | − | − | + | − | − | + | − | − | − | + | − | − |
| Sucrose | + | − | + | + | − | + | + | − | + | + | − | − | − | + | − | − |
| Glycerine | + | − | + | + | − | + | + | − | − | + | − | + | + | − | ±~− |
| Xylose | + | − | + | + | − | + | + | − | − | + | − | + | + | − | + |

NOTE.—In the second column of the above table, the symbols "A", "B" and "C" mean growth, gas evolution and acid formation, respectively.

TABLE 3 (TABLE 3-4)
DECOMPOSITION OF SUGARS (HUGH LEIFSON'S METHOD)

| | No. 2327 | B-16 | No. 29 | No. 103 | CB-416 |
|---|---|---|---|---|---|
| Lactose: | | | | | |
| C | ± | − | − | − | − |
| O | + | − | − | − | − |
| Glucose: | | | | | |
| C | ± | − | − | − | ± |
| O | + | + | ± | + | + |

NOTE.—C: Closed; O: opened;—means neutral or alkaline reaction; ± means weak acid reaction; + means strong reaction.

TABLE 3 (TABLE 3-5)
ASSIMILATION OF CARBON COMPOUNDS

| | No. 2327 | B-16 | No. 29 | No. 103 | CB-416 |
|---|---|---|---|---|---|
| Glucose | + | + | + | + | + |
| Gluconic acid | + | + | − | + | + |
| 2-keto-gluconic acid | + | + | − | + | + |
| 5-keto-gluconic acid | − | − | − | − | − |
| Citric acid | − | + | − | + | + |
| Succinic acid | − | + | + | + | + |
| Ethanol | ± | + | − | + | + |
| Phenol | − | − | − | − | − |
| Benzoic acid | − | + | − | ± | + |
| Salicylic acid | − | − | − | − | − |
| m-Hydroxybenzoic acid | − | − | − | − | − |
| p-Hydroxybenzoic acid | + | + | − | + | + |
| Protocatechnic acid | − | + | − | + | − |
| Gentisinic acid.g | − | − | − | − | − |
| Anthranilic acid | − | + | − | − | + |
| p-Aminobenzoic acid | − | − | − | − | − |

TABLE 3 (TABLE 3-6)
GROWTH ON THE SELECTIVE MEDIA BY K. KOMAGATA'S METHOD

| | No. 2327 | B-16 | No. 29 | No. 103 | CB-416 |
|---|---|---|---|---|---|
| Glucose plus ammonium salt | +++ | ++ | − | + | + |
| p-Hydroxybenzoate | ++ | ++ | − | + | + |
| Glucose plus nitrate | −~± | + | − | + | + |
| Succinate plus nitrate | − | + | ± | + | ++ |
| Glutamate (after 7 days at 30° C.) | ++ | ++ | + | ++ | ++ |

In view of the cultural characteristics as above and with reference to Bergey's Manual of Determinative Bacteriology (7th ed.), No. 2327 strain is identified as belonging to Pseudomonas genus. However, it is considered as a new strain and named Pseudomonas pyrrocinia by taking into consideration the following characteristics:

(1) Neither water-soluble nor water-insoluble pigments are formed, but 2-keto-gluconic acid is produced from gluconic acid.

(2) Utilization of saccharides, particularly disaccharides, is intense, and an acid is produced from lactose.

(3) In B.C.P. milk test, milk is liquefied at a slightly acidic side.

(4) Optimum pH for growth is about 5–6.

No. B-16 strain, which is identifiable as one of Pseudomonas species with reference to the Bergey's manual, is considered as Pseudomonas aeruginosa with further reference to Journal of the Agricultural Chemistry, Japan 35, 981 (1961), 36, 663 (1962) and 36, 668 (1962), in view of the following characteristics:

(1) Green pigment is formed well.
(2) Growth well at 42° C.
(3) 2-keto-gluconic acid is produced from glucose.

With reference to the Bergey's manual, No. 29 strain is identified as Pseudomonas mephitica.

With reference to the Bergey's manual, No. 103 strain is identified as Pseudomonas ovalis.

With reference to the Bergey's manual, CB-416 strain is identified as Pseudomonas shuylkilliensis.

Suitable microorganisms for the production of pyrrolnitrin widely covers strains of Pseudomonas genus including the above-illustrated Pseudomonas pyrrocinia, Pseudomonas aeruginosa, Pseudomonas mephitica, Pseudomonas ovalis and Pseudomonas shuylkilliensis as well as their mutants and variants. It is to be understood that there are other Pseudomonas strains suitable for the production of pyrrolnitrin than those specified above and such pyrrolnitrin-producing strains can be easily selected from Pseudomonas genus by those skilled in the art with reference to the physical, chemical and physiological properties of pyrrolnitrin as detailed hereinafter.

Fermentation process for production of pyrrolnitrin can be conveniently carried out by shake or submerged culture in an ordinary liquid culture. Not only natural media but also synthetic media may be used as the culture medium. Suitable carbon sources include glycerine, glucose, starch, sucrose, etc. and suitable nitrogen sources are peptone water, meat extract, corn steep liquor, soybean meal, urea, ammonium salts, nitrates, etc. Other inorganic salts, e.g. phosphates, sodium chloride, magnesium sulfate, calcium carbonate, etc., may be added, and the salts comprising ferric or ferrous ions (e.g. ferric sulfate, ferrous sulfate) may be used effectively as inorganic salts to obtain the desired substance in high yield. Suitable defoaming agent, e.g. soybean oil, silicone, etc., can be used if necessary. Ingredients of a culture medium can be optionally determined depending on the type of a strain to be cultured. Usually, cultivation can be carried out at about 25° to about 37° C., and at such temperature, the production of desired antibiotic substance will reach maximum within the period of 2 to 5 days.

Pyrrolnitrin, which is accumulated in the fermentation broth, can be isolated, for example, by extracting the desired substance from the cells with a suitable solvent, removing impurities off, and concentrating the resulting solution in an appropriate manner. Extraction and purification methods generally used in the field of the antibiotic industry may be used, e.g. solvent extraction method, carbon process, and absorption chromatography method. After completion of cultivation, for instance the cells are separated from the culture broth by means of a filter or centrifugal separator and then the separated cells are extracted with acetone or the like with agitation. The extract is purified with active carbon and then concentrated under reduced pressure. The concentrate is extracted again with another solvent, e.g. butyl acetate, petroleum benzine, etc. The extract is washed with aqueous alkali or acid, filtered and then concentrated. The crude oily substance is subjected to chromatography using alumina and then the adsorbed substance is eluted with a suitable solvent to obtain a concentrated fraction from which crude crystalline product can be obtained with methanol-cyclohexane or the like mixed solvent. After recrystallization from a solvent, pure crystalline product is obtained.

The crystalline product thus obtained is a neutral substance in the form of pale yellow plates or needles. It has a melting point of 125° C. This is a new chemical compound named 3-(2-nitro-3-chlorophenyl)-4-chloro-pyrrole having the structural formula

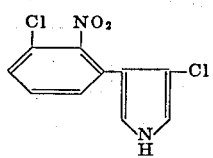

The elementary analysis of this product shows the following result:

Calcd. for $C_{10}H_6O_2N_2Cl_2$ (percent): C, 46.71; H, 2.33; O, 12.45; N, 10.89; Cl, 27.68. Found (percent): C, 45.68; H, 2.42; O, 12.41; N, 10.82; Cl, 27.23.

The molecular weight of the product is 257. The product shows no depression in melting point when mixed with an authentic sample of 3-(2-nitro-3-chlorophenyl)-4-chloropyrrole) prepared by synthetic procedures. Other physical and chemical properties of the product will be given below.

This product is soluble in methanol, ethanol, n-propanol, n-butanol, pentanol, methyl acetate, ethyl acetate, butyl acetate, pentyl acetate, acetone, ether, chloroform, glacial acetic acid, acetic anhydride, petroleum ether, petroleum benzine and ligroin, and sparingly soluble in water and cyclohexane.

With respect to the coloring reactions of the product, it is positive in ninhydrin reaction (brown) and in both Tollens and Pauly reactions (red), and negative in tests with Fehling solution (hot or cold), alcoholic silver nitrate, ferric chloride and 2,4-dinitrophenylhydrazine. Concentrated sulfuric acid is not colorized where it is kept with the product at room temperature for 24 hours. Biological activity of the product shows no significant change even after the product is heated in benzene at 80° C. for 30 minutes.

Infrared absorption at 3480 cm.$^{-1}$ confirms the existence of a pyrrole nucleus in the product. This is also confirmed by purple coloration of this product in Ehrlich's reaction and by nuclear magnetic resonance spectrum. Further, infrared absorption appearing at 1530 and 1375 cm.$^{-1}$ shows the existence of nitro group. Ultraviolet absorption of the compound is $\lambda_{max.}$ 252 m$\mu$ ($\epsilon=7500$) in ethanol. (See FIGS. 1, 2 and 3.)

The decomposition tests of this compound are as follows:

(1) Both oxidation with chromic oxide and ozonolysis of the product yield an acid imide with the empirical formula $C_{10}H_4O_4N_2Cl_2$ and a melting point of 172° C. Ultraviolet absorption spectrum of the acid imide shows a characteristic absorption $\lambda_{max}$ 310 m$\mu$ ($\epsilon=2870$) and infrared absorption appears at 1790 and 1740 cm.$^{-1}$ (KBr tablet).

(2) Oxidation of the product with a permanganate yields a carboxylic acid with the empirical formula $$C_7H_4O_4NCl$$

and a melting point of 232° C. The carboxylic acid has the following elementary analysis:

Calcd. (percent): C, 41.60; H, 1.98; O, 31.78; N, 6.94; Cl, 17.58. Found (percent): C, 41.78; H, 2.25; O, 31.48; N, 7.18; Cl, 17.33.

Ultraviolet absorption of the carboxylic acid is $\lambda_{max.}$ 283 m$\mu$ ($\epsilon=1030$) in ethanol. Infrared absorption of this carboxylic acid appears at 1550 and 1370 cm.$^{-1}$ (KBr tablet), and this is identical with that of an authentic sample of 2-nitro-3-chlorobenzoic acid.

Pyrrolnitrin shows extremely high activity against fungus, particularly Trichophyton. It shows weak activity against gram-positive bacteria, and substantially inactive against gram-negative bacteria and acid-fast microorganisms. The antibiotic activity of this product is measured according to the agar dilution method. The result is shown in the following table:

| | Minimum growth inhibitory (concentration γ/ml.) |
|---|---|
| Staphylococcus aureus 209 P | 6.2 |
| Bacillus subtilis PCI 219 | 12.5 |
| Escherichia coli | 250 |
| Pseudomonas aeruginosa | 250 |
| Mycobacterium SP 607 | 250 |
| Aspergillus niger | 12.5 |
| Penicillium chrysogenum | 0.2 |
| Trichophyton asteroides | 0.05 |
| Torula utilis | 15.0 |
| Candida albicans | 15.0 |

In the bioassay of a culture potency, Trichophyton asteroides and Penicillium chrysogenum are preferred test microorganisms. Sabougraud agar (glucose 4%, peptone 1%, agar 1.5%, pH 6.5) is placed as a slant culture medium in a test tube. After inoculation, incubation is effected at 30° C. for 7 days. 2.5 ml. of sterile water is added and cells are scraped by a platinum loop to form a cell suspension. A suitable amount of the cell suspension is added to Sabougraud agar, and stirred uniformly. Using this as an upper layer, agar plates for bioassay are prepared in the manner known per se. Incubation for bioassay is carried out at 28-30° C. for 40 hours, and then, antibiotic potency is assayed. Contamination with infectious bacteria which occasionally occurs during the rather long period of incubation can be prevented by diluting a test liquid with a phosphoric acid-buffered solution (pH 6.0) containing 0.1% chloramphenicol where a cup method is employed or by using a dry pulp disc previously impregnated with a methanolic solution containing 0.1% chloramphenicol where a pulp method is employed.

Pyrrolnitrin when intraperitoneally injected to mice have an $LD_{50}$ value of 500 mg./kg. No substantial change in systemic condition and body weight increase is observed when pyrrolnitrin is administered to rats at the dosage of 30 mg./kg. daily over the period of three months.

In order to substantiate the clinical utility of pyrrolnitrin, the following clinical tests were instituted. The pyrrolnitrin preparation used was a solution containing 0.5% (w./v.) pyrrolnitrin in 70% by volume of 99% alcohol and 30% by volume of propyleneglycol or a solution containing 1% (w./v) pyrrolnitrin in 80% by volume of 70% alcohol and 2% of diethyl sebacate. This alcoholic solution was applied to the affected skin of a number of patients one or three-times daily. The result obtained are as follows:

| Result | Disease | | | | Total |
|---|---|---|---|---|---|
| | Tinea cruris | Tinea tedis | Tinea corporis | Tinea veriscolor | |
| Very effective | 28 | 3 | 1 | 2 | 34 |
| Effective | 44 | 71 | 3 | | 118 |
| Ineffective | 6 | 26 | | | 32 |
| Total | 78 | 100 | 4 | 2 | 184 |

NOTE.—Very effective: Turn to negative for fungi under a microscope and complete disappearance of subjective and objective symptoms; Effective: Remarkable turn for the better in subjective and objective symptoms; Ineffective: No symptomatic changes.

As apparent from table, pyrrolnitrin was found to be 82.6 percent effective, and no substantial side effects were observed.

Pyrrolnitrin can be used in various medicinal forms such as spray solutions, tinctures, ointments, etc. It is most convenient to use it in the form of alcoholic aqueous solution, and in this form the substance is stable, even when stored at room temperature over one year. For topical application, pyrrolnitrin in concentration as 0.25-3% will be sufficiently effective. Furthermore, pyrrolnitrin may be used in preparations mixed with other medicaments.

Example 1

*Pseudomonas pyrrocinia* No. 2327 is inoculated to a nutrient agar slant culture medium, and incubation is carried out at 37° C. for 48 hours. Separately, 100 ml. of a culture medium which is prepared by dissolving 1% glucose, 5% meat extract, 5% polypeptone and 2% sodium chloride in an aqueous solution containing 0.2 molar potassium dihydrogen phosphate and 0.2 molar sodium hydrogen phosphate is placed in a 500 ml. shake flask and then sterilized at 120° C. for 15 minutes. The inoculum obtained by slant culture is inoculated in one platinum loop to the shake flask. Shaking culture of the inoculum is carried out at 30° C. for 24 hours. The culture broth thus prepared is inoculated in amount of 5% by volume to the shake flask containing the sterilized culture medium as above. Shake culture is effected at 30° C. for three days. The fermentation broth is divided to cells and a supernatant by centrifugation at 6500 r.p.m. The cell cake as formed is removed from the supernatant, and 60% aqueous acetone in amount of one-twentieth by volume of the broth is added thereto. Stirring is made at 50° C. for about 3 hours thereby to effect extraction of desired antibiotic substance with acetone. The acetone extract is recovered by filtration and then added with active carbon. Stirring is made for a short time to have impurities adsorbed with the active carbon. After filtration, the resulted extract is concentrated at about 40° C. under reduced pressure to make it one-fifth by volume. Using an equal volume of butyl acetate, the concentrated liquid is extracted three times. The butyl acetate layer is washed with aqueous alkali having pH 10.0 and then concentrated to have 100 mg. of an oily material. This is dissolved in methanol, and the resulted solution is added with five times by volume of cyclohexane. The resulting mixture is kept in an ice box. Desired product is obtained as yellow precipitate.

EXAMPLE 2

Into each of four glass jars (15 ml. volume), 8 ml. of a culture medium containing 0.5% meat extract, 0.5% peptone, 0.2% sodium chloride and 1% glucose and having a pH of 6.0 is charged, and sterilization is conducted at 120° C. for 20 hours. The inoculum (*Pseudomonas pyrrocinia* No. 2327) obtained from the same culture medium as used in Example 1 by shake culture at 30° C. for 24 hours is inoculated in 5% by volume to each of the jars. Incubation is carried out at 28° C. with stirring at 330 r.p.m., while sterilized air is passed into the jars. Vigorous foaming is prevented by adding sterilized soybean oil dropwise. After 48 hours, the fermentation broth is recovered, and cells are collected by means of a Sharples centrifugal machine. To the resulted cell cake, 70% aqueous acetone is added in amount of five times by volume based on the wet weight of the collected cells. After allowing the resulting mixture to stand for 24 hours at room temperature, the cells are filtered off. The acetone extract is concentrated under reduced pressure to have a white turbid liquid concentrate which is in turn extracted with an equal volume of petroleum benzine. The resulting extract is washed well with aqueous alkali, aqueous acid and water in sequence, and then concentrated. The resulted concentrated extract is dried and then passed through a column filled with alumina. Desired antibiotic substance adsorbed on alumina is washed by passing petroleum benzine and n-hexane through the column. Elution is made by using benzene. The effluents which are active against Tricophyton are collected and then concentrated under reduced pressure, thereby to obtain a syrup. This is dissolved in methanol. The methanolic solution is freed from impurities by filtration and then added with cyclohexane at the proportion of 3 parts per part of the methanolic solution. The mixture is kept in an ice box to have yellow precipitate. This is recrystallized from methanol-cyclohexane. Pure crystalline product obtained is 50 mg.

Example 3

*Pseudomonas aeruginosa* B16 strain is inoculated to a nutrient agar slant, and incubation is effected at 37° C. for 48 hours. 100 ml. of a culture medium comprising 1% polypeptone, 1% meat extract, 0.5% sodium chloride, 2.65% potassium dihydrogen phosphate and 0.18% sodium dihydrogen phosphate (12 $H_2O$) is placed in a 500 ml. shaking flask and sterilized at 120° C. for 15 minutes. The inoculum taken from the slant culture medium is inoculated in a platinum loop to the flask, and shaking culture is conducted at 37° C. for 24 hours. The culture broth thus obtained is inoculated to 10 l. of the culture medium of the same composition as above, in a 15 l. jar fermenter, said culture medium having been sterilized at 120° C. for 30 minutes. Cultivation is conducted at 30° C. for 3 days, with propellar agitation at 330 r.p.m., while sterilized air is passed thereinto at the rate of about 10 l. per minute.

The culture broth thus obtained is added with about 1% diatomaceous earth and the mixture is filtered to collect cells. The resulted cell cake is extracted with about 1 l. of 80% aqueous acetone under warming and then separated by filtration. The acetone extract obtained is concentrated under reduced pressure. The concentrate is then extracted three times with 200 ml. each of petroleum benzine. The extracts are combined and washed with an equal amount of water, decolorized with a small amount of active carbon and then concentrated to an oily material. This is passed into a column filled with alumina/petroleum benzine. Desired antibiotic substance adsorbed on alumina is washed by passing petroleum benzine and n-hexane through the column, and then eluted with benzene. Among the eluted fractions, those which show high activity against Tricophyton are collected and then concentrated under reduced pressure to have a syrup. This is dissolved in methanol to remove undissolved matters. The solution obtained is added with cyclohexane at the proportion of 3 parts per part of the solution and the mixture is kept in an ice box. The yellow precipitate thus formed is collected and recrystallized from methanol-cyclohexane. Pure crystalline product is obtained, M.P. 125° C. Yield about 70 mg.

Example 4

*Pseudomonas mephitica* No. 29 strain is inoculated to a nutrient agar slant culture medium. Incubation is carried out at 30° C. for 48 hours. 100 ml. of a liquid culture medium comprising 1% polypeptone, 1% meat extract, 0.5% sodium chloride, 2.18% potassium dihydrogen phosphate and 1.43% disodium hydrogen phosphate ($12H_2O$) is placed in a 500 ml. shake flask and sterilized at 120° C. for 15 minutes. Into several shake flasks thus prepared, the inoculum obtained from the slant culture is inoculated in amount of one platinum loop. Shake culture is held at 30° C. for 24 hours. From the fermentation broth, cells are collected by a centrifugal separator operating at 6,500 r.p.m. The wet cell cake is treated with 500 ml. of 100% acetone at 50° C. for 3 hours. After filtration, the extract is purified by treatment with active carbon. It is then concentrated to make its volume about one-sixth. The resulted concentrate is extracted three times with butyl acetate of the same quantity. The butyl acetate extract is washed with aqueous alkali (pH 10) and concenrated under reduced pressure to have an oily material, which is then worked up in the same manner as in Example 3. 30 mg. of pure crystalline product is obtained.

Example 5

*Pseudomonas ovalis* No. 103 is inoculated to a nutrient agar slant culture medium, and incubation is effected at 30° C. for 48 hours. 100 ml. of a liquid culture medium comprising 3% glycerine, 1% soybean meal, 0.05% magnesium sulfate, 0.3% sodium chloride, 2.18% potassium dihydrogen phosphate and 1.43% disodium hydrogen phosphate ($12H_2O$) is placed in each of several shake flasks (500 ml. volume), and sterilization is made at 120° C. for 15 minutes. To these flasks, the inoculum is inoculated from the above slant culture in amount of one platinum loop, and shake culture is held at 30° C. for 24 hours.

To each of the four glass jars used in Example 3, 8 l. of the same culture medium as specified above is charged, and sterilization is carried out at 120° C. for 30 minutes. To the culture medium thus prepared, the inoculum obtained as above is inoculated in seed volume of 2%, and cultivation is carried out at 30° C. for 24 hours with stirring, while sterilized air is passed therein at the rate of about 8 l./min. Under the sterilized condition, 30 l. of the culture broth recovered from the four jars is inoculated to 2500 l. of the same culture medium as above which is placed in a 4000 l. stainless steel fermenter, said culture medium having been sterilized at 120° C. for 40 minutes and then cooled down to 30° C. Cultivation is carried out at 30° C. for 60 hours with propeller agitation at 180 r.p.m., while sterilized air is blown into the vessel in the equal amount to the culture medium at every minute.

To the fermentation broth, about 2% of diatomaceous earth is added. Then the broth is filtered by means of a filter press, and the cells collected are added with 300 l. of acetone. Extraction is effected at 40° C. for 3 hours with stirring. The procedures for extraction are repeated twice. The resulted acetone extract is concentrated at 40° C. under reduced pressure to make its volume one-tenth. The concentrated liquid is extracted three times with 160 l. of petroleum benzine. The extract obtained is washed with an equal volume of water and decolorized with active carbon. Then it is concentrated at 40° C. under reduced pressure to have about 700 g. of an oily concentrate. This is extracted with 3 l. of ethyl acetate. The extract is concentrated to have an oily material which is then dissolved in 1500 ml. of n-hexane. The resulting solution is developed with n-hexane over 1600 g. of 100 mesh silicagel contained in a 10 cm. x 70 cm. glass column. Elution of the effective substance is made by using n-hexane-benzene mixture. Trichophyton-active fractions are collected. About 500 ml. of the collected fractions are concentrated under reduced pressure. The oily material obtained is added with n-hexane, and the mixture is allowed to stand with the result that about 11 g. of crude crystalline product is obtained. This is dissolved in about 200 ml. of benzene and the resulted solution is subject to column chromatography using activated magnesium silicate. Elution is made by using benzene. Yellow fractions are collected and concentrated under reduced pressure thereby to yield 10 g. of pure crystalline product, M.P. 125° C.

Example 6

*Pseudomonas shuylkilliensis* CB—416 inoculated to glycerine yeast extract agar slant, and incubation is carried out at 30° C. for 48 hours. 100 ml. of a culture medium comprising 3% glycerine, 1% gluten meal, 1% dried yeast, 0.5% corn steep liquor (pH 7.0) and 0.025% $FeSO_4 \cdot 7H_2O$ is placed in each of two 500 ml. shake flasks and sterilized at 120° C. for 15 minutes. The inoculum taken from the slant culture is inoculated in a pick of a platinum loop to the flasks, and shaking culture is carried out at 30° C. for 48 hours. The culture broth thus obtained is inoculated to 8 l. of the same culture medium as above which is placed in a 15 l. jar-fermenter, said culture medium having been sterilized at 120° C. for 30 minutes and then cooled. Cultivation is conducted at 30° C. for 96 hours with propeller agitation at 330 r.p.m., while sterilized air is passed thereinto. The fermentation broth thereby obtained is treated in the same manner as in Example 3 to obtain 138 mg. of pure crystalline product, M.P. 125° C.

What we claim is:
1. 3-(2-nitro-3-chlorophenyl)-4-chloro-pyrrole.

References Cited

Arima et al.: Agr. Biol. Chem., vol. 28, No. 8, pp. 575–576 (1964).

JEROME D. GOLDBERG, Primary Examiner

U.S. Cl. X.R.

424—274; 195—80, 96

UNITED STATES PATENT OFFICE
CERTIFICATE OF CORRECTION

Patent No. 3,699,121  Dated October 17, 1972

Inventor(s) Kei Arima, et al.

It is certified that error appears in the above-identified patent and that said Letters Patent are hereby corrected as shown below:

Column 1, line 9, after "16,338" insert --and application Japan, June 12, 1964, 39/33,177--.

Signed and sealed this 24th day of April 1973.

(SEAL)
Attest:

EDWARD M. FLETCHER, JR.　　　　　ROBERT GOTTSCHALK
Attesting Officer　　　　　　　　Commissioner of Patents